United States Patent [19]
Vishin et al.

[11] Patent Number: 5,761,722
[45] Date of Patent: Jun. 2, 1998

[54] METHOD AND APPARATUS FOR SOLVING THE STALE DATA PROBLEM OCCURRING IN DATA ACCESS PERFORMED WITH DATA CACHES

[75] Inventors: Sanjay Vishin, Sunnyvale; Joseph A. Petolino, Jr., Palo Alto, both of Calif.

[73] Assignee: Sun Microsystems, Inc., Mountain View, Calif.

[21] Appl. No.: 790,382

[22] Filed: Jan. 29, 1997

Related U.S. Application Data

[63] Continuation of Ser. No. 380,050, Jan. 30, 1995, abandoned.

[51] Int. Cl.$^6$ .............................. G06F 12/00; G06F 13/00
[52] U.S. Cl. ..................... 711/141; 711/202; 711/203; 711/210; 711/118; 711/142
[58] Field of Search ................... 364/DIG. 1, DIG. 2, 364/243.4, 243.41; 395/420, 444, 445, 468, 412, 413, 469; 711/202, 203, 210, 117, 118, 141, 142

[56] References Cited

U.S. PATENT DOCUMENTS

| | | | |
|---|---|---|---|
| 4,825,412 | 4/1989 | Sager et al. | 365/49 |
| 5,136,691 | 8/1992 | Baror | 395/469 |
| 5,163,142 | 11/1992 | Mageau . | |
| 5,197,139 | 3/1993 | Emma et al. | 395/469 |
| 5,228,134 | 7/1993 | MacWilliams et al. | 395/465 |
| 5,301,290 | 4/1994 | Tetzlaff et al. | 395/469 |
| 5,359,723 | 10/1994 | Mathews et al. | 395/469 |

*Primary Examiner*—Tod R. Swann
*Assistant Examiner*—Tuan V. Thai
*Attorney, Agent, or Firm*—Blakely Sokoloff Taylor & Zafman

[57] ABSTRACT

Methods and apparatus for using a store allocate policy to eliminate the stale data problem in a direct mapped, write-through virtual data cache. A hardware mechanism provided by the present invention, ensures that a single cache location associated with more than one virtual address does not become stale with respect to the main memory. By using a store allocate policy along with a write-through virtual cache, each time a store miss occurs, the data cache location for which the store miss occurred will be updated with new data brought back from the main memory along with a new cache tag. The store allocate policy for a write-through virtual data cache is implemented by a data cache controller. Thus, using this cache policy, the cache is updated along with the main memory even after a store miss. Furthermore, since not more than one virtual address may exist at any one time in the cache, it is ensured that a virtual address that is found in the cache will always contain the most updated data, hence overcoming the stale data problem.

12 Claims, 7 Drawing Sheets

METHOD AND APPARATUS FOR SOLVING THE STALE DATA PROBLEM OCCURRING IN DATA ACCESS PERFORMED WITH DATA CACHES

This is a continuation application of application No. 08/380,050 filed Jan. 30, 1995, now abandoned.

BACKGROUND OF THE INVENTION

1. Field of the Invention

The invention relates to computer systems, more particularly, to the methods and apparatus for solving stale data problems in data caches occurring during data access in a computer system.

2. Art Background

In a computer system, memory references to data at any given interval of time tend to be confined within a few localized areas in memory. In order to reduce memory access time, active portions of a program and data stored in a main memory are placed in a fast, small memory referred to as a cache memory, hence increasing the speed for the execution of the program on a computer system.

A typical computer program flows in a straight line fashion with frequent program loops and subroutine calls. A Central Processing Unit (CPU) repeatedly accesses a set of instruction in memory which constitute a loop during a program loop execution. In addition, the CPU accesses a set of instructions attendant to each subroutine call. Therefore, a typical program having numerous program loops and subroutine calls tends to localize the CPU access/reference to main memory for fetching instructions.

Memory references to data tend to also be localized. For example, array of numbers are confined within a local portion of memory, and therefore tend to localize memory references to data attendant to array of numbers. Further, table-lookup procedures make repeated references to the portion of memory where the table is stored. In addition, iterative procedures refer to common memory locations.

These active portions of the program and data are placed in a cache memory so that they may be accessed by the CPU faster than it would be able to access the same portions of data from the main memory. When the CPU needs to access the main memory, the cache memory is first examined. If the data being accessed is found in the cache memory, the data is read from the cache memory by the CPU. Otherwise, if the data is not found in the cache memory (a situation referred to as a "cache miss"), then the CPU accesses the main memory to read the data. The data read from the main memory is then transferred from the main memory to the cache memory for future reference.

In systems using virtual addressing, caches come in basically two types. One type of cache is a virtual cache 100 and another type of cache is a physical cache 110 (see FIG. 1). A virtual cache is a cache which is addressed by the virtual addresses generated by the CPU. A physical cache on the other hand is a cache which is addressed by the physical addresses generated by the Memory Management Unit (MMU). The MMU translates virtual addresses into physical addresses.

Unlike physically tagged caches, virtually tagged caches allow cache lookup to occur independently from MMU lookups. However, even though the use of virtual caches, in contrast to the use of physical caches, reduces processor cycle time, virtual caches create consistency problems. In virtual caches, a physical address (pa1) in memory 200 may be represented by more than one corresponding cache line va1 and va2 in the cache 210 (see FIG. 2). Thus, when there are more than one virtual addresses mapped to a single physical address, certain cache locations may become stale (referred to and explained below as the "stale data problem") with respect to the memory location they are caching. Hence a problem arises when the processor 220 attempts to access data in the cache.

FIG. 3 is an exemplary illustration of a stale data problem in virtual data caches. The effect of instructions 10 on cache 12 and memory 14 through four steps of progression of time 16 illustrates the stale data problem. The stale data problem is the loading of bad data to the CPU register from cache memory, caused by alias addresses in a virtual cache. Cache 12 is a direct-mapped write-through cache. Write-through is a technique for writing from the processor simultaneously into the cache memory and into the main memory, hence updating both the main memory and the cache. This ensures consistency between the two memory locations. A direct-mapped cache is where there is only one possible cache location for each memory location data entry.

In this example (see FIG. 2) virtual address 1 (va1) and virtual address 2 (va2) are both mapped to one physical address 1 (pa1). Valid bit 18 for corresponding tag 19 is a status bit stored in the cache and is used to identify cache addresses with currently valid data.

In step 1, physical address pa1 is indicated to contain data Y. In step 2, a load to a CPU register from virtual address va2 is performed. Valid bit 18 for va2 is presently zero, indicating that va2 does not contain currently valid data in the cache. The instruction in Step 2 causes a cache miss, and data Y is fetched from pa1 and stored in cache location 12. This cache entry corresponds to virtual address va2.

In step 3, a store instruction from the CPU register of a value of "Z" to virtual address va1 (an alias address of va2) is performed. This store misses the cache since the valid bit for va1 is zero, and the processor is only aware of va2 mapped to pa1. The data Z is therefore stored to physical address location pa1 of memory 14 because cache 12 is a write-through data cache. However the store instruction leaves a stale copy of pa1 (i.e. the data Y) in data cache location 12 corresponding to va2.

In step 4, a subsequent load instruction from va2 loads the "stale" data in the cache location corresponding to virtual address va2. Hence a load of an incorrect data Y is made to the CPU register, when the correct data to be loaded from main memory was Z. This loading of "bad data" (Y as opposed to Z) to the CPU from the cache memory caused by multiple virtual addresses being aliased to a single physical address (va1, va2-->pa1) in a virtual cache is termed as "the stale data problem".

Thus, a method and apparatus for allowing the use of virtual caches while preventing the stale data problem for a direct mapped data cache is desired.

SUMMARY OF THE INVENTION

The invention provides methods and apparatus for using a store allocate policy to eliminate the stale data problem in a direct mapped, write-through virtual data cache.

A combination of hardware and software mechanisms are utilized to solve the stale data problem. The software mechanism (operating system) is responsible for constructing a virtual to physical page mapping to ensure that, if two virtual addresses map to the same physical location in a main memory, the very same two virtual addresses will also both map to the same cache location in a cache memory. Since the two virtual addresses will now map into the same cache line and, since the cache is direct mapped, the two different virtual addresses which map to the same physical address cannot exist simultaneously in the cache. This software mechanism may be provided by an existing operating system such as the Sun OS® (e.g., from a port of a Solaris to a particular processor).

The hardware mechanism which is provided by the present invention, ensures that the single cache location associated with more than one virtual address does not become stale with respect to the main memory. In a write-through virtual cache, only the cache locations may become stale with respect to the corresponding location in the main memory. The store allocate policy for a write-through virtual data cache is implemented by a data cache controller for the virtual data cache. A store allocate policy is a policy for updating cache lines such that, on a store miss, the data (or cache line) is actually brought back from main memory and is "allocated" in the cache. This, as opposed to just updating the main memory for a store miss in a cache utilizing a "non-allocate" policy. In a "non-allocate" policy, the cache is left untouched on a store miss.

By using a store allocate policy along with a write-through virtual cache, each time a store miss occurs, a data cache line for which a store miss occurred will be updated with new data brought back from the main memory, along with a new tag. Thus, using this allocate cache policy, the cache is updated along with the main memory even after a store miss. Furthermore, since not more than one virtual address may exist at any one time in the cache line, it is ensured that a virtual address that is found in the cache will always contain the most updated data, hence overcoming the stale data problem.

DETAILED DESCRIPTION OF THE INVENTION

Apparatus and methods for using a store-allocate policy to eliminate the stale data problem in a direct-mapped, write-through virtual data cache are disclosed. The present invention uses a store-allocate policy with a write-through virtual data cache to prevent the stale data problem.

Figure 4:
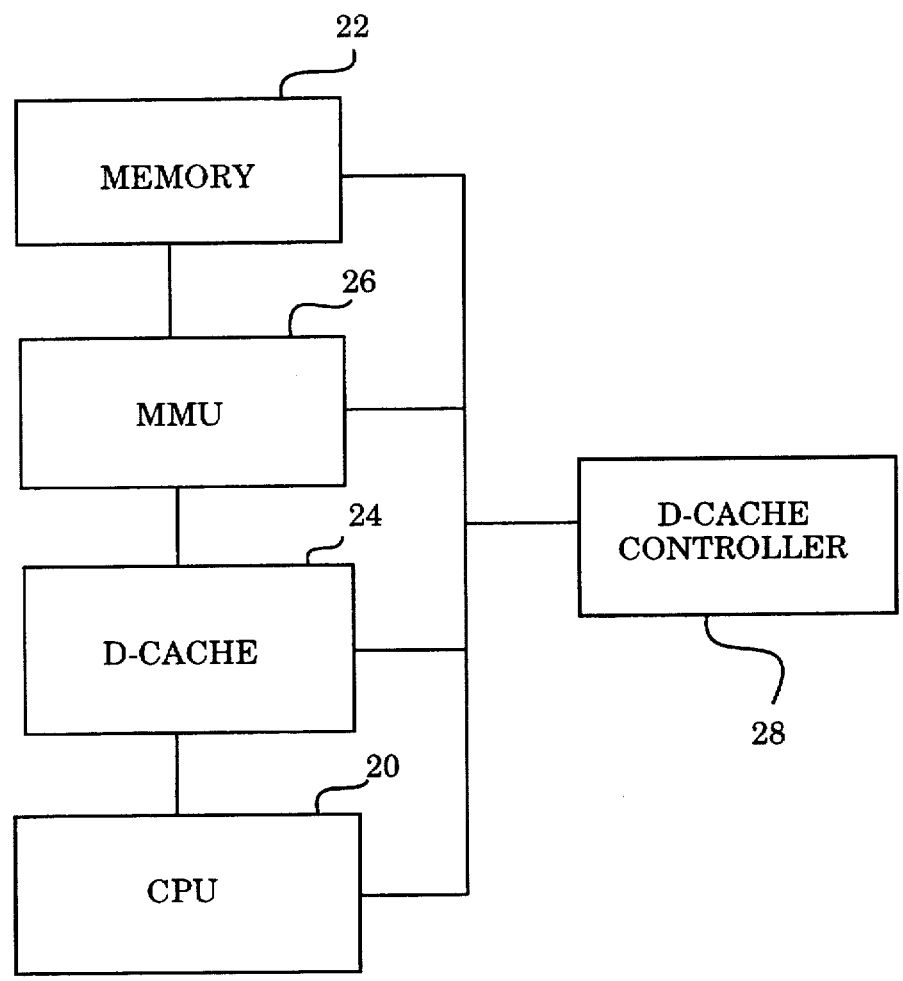
FIG. 4 is a block diagram illustrating a memory system hierarchy of the present invention.

FIG. 4 is a block diagram of a memory system hierarchy of the present invention. Central Processing Unit (CPU) 20 communicates with memory 22 and data cache 24 (D-cache) to access data. CPU 20 generates a virtual address and D-cache 24 operates on the virtual address. D-cache 24 transmits the data requested to CPU 20 if the data is in the cache (i.e. a cache hit). Otherwise on a data cache miss, the virtual address is translated by memory management unit 26 (MMU) into a physical address and the corresponding cache line in memory 22 is accessed. Data D-cache controller 28 controls the data transmission into and out of D-cache 24.

Figure 1:
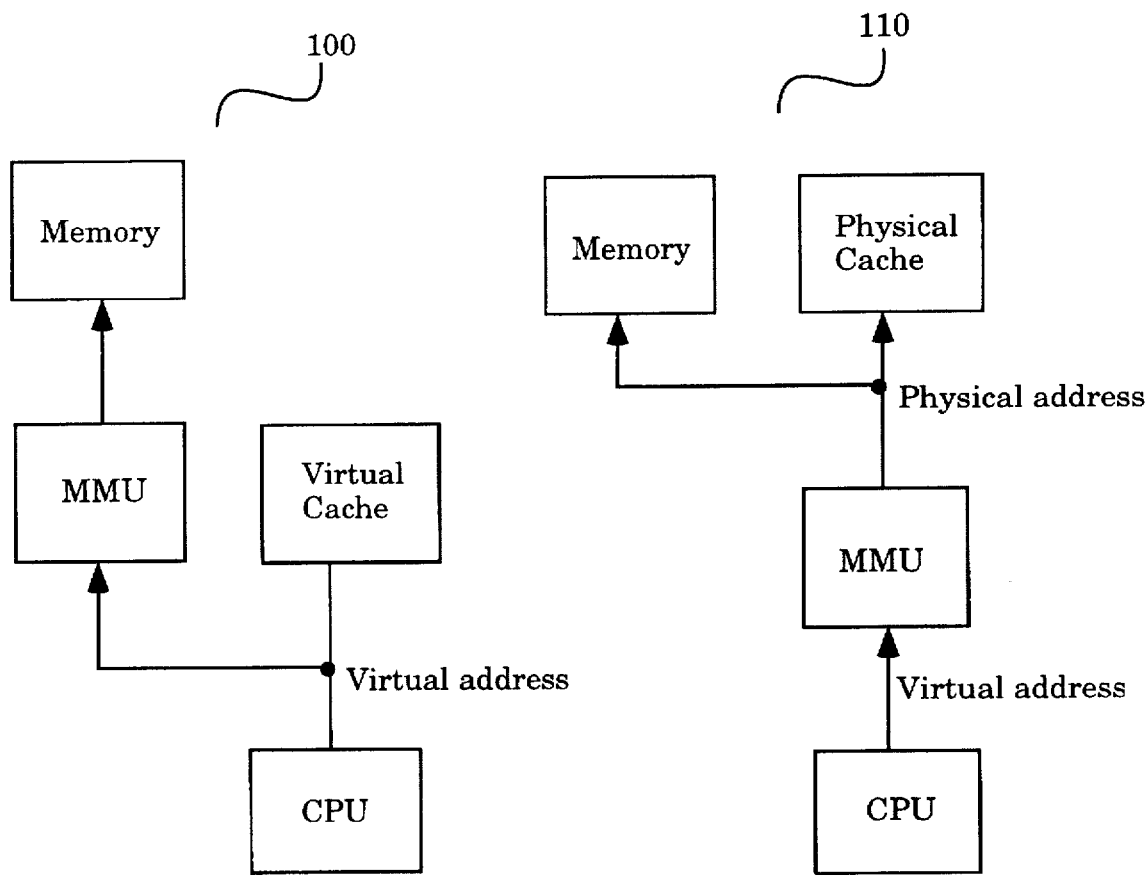
FIG. 1 is an illustration of the difference between a virtual and a physical cache.
Figure 2:
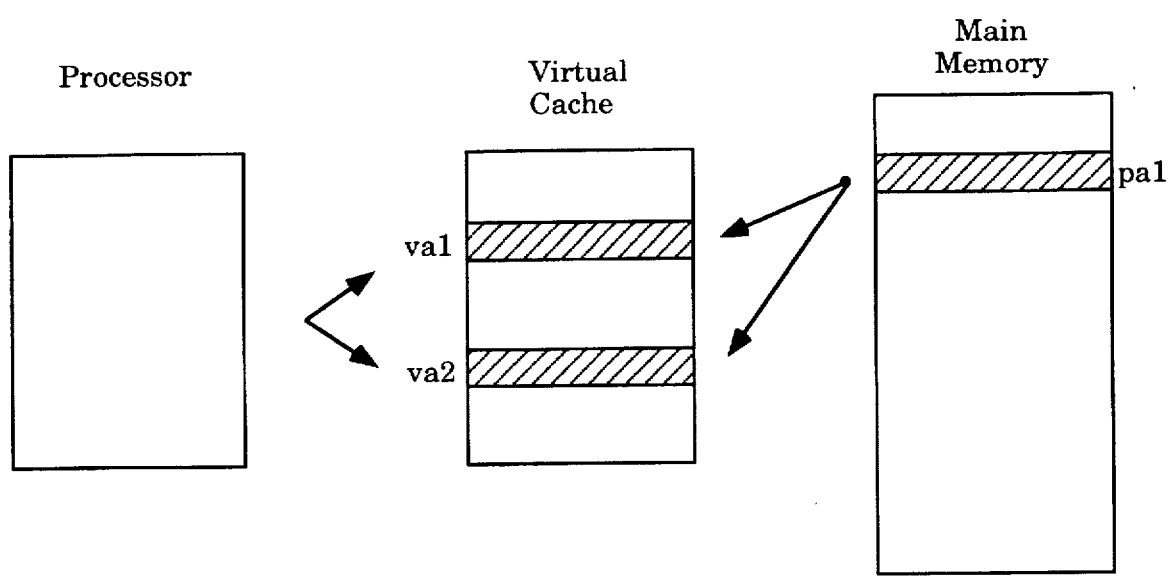
FIG. 2 is an illustration of multiple mappings of a single physical address.
Figure 3:
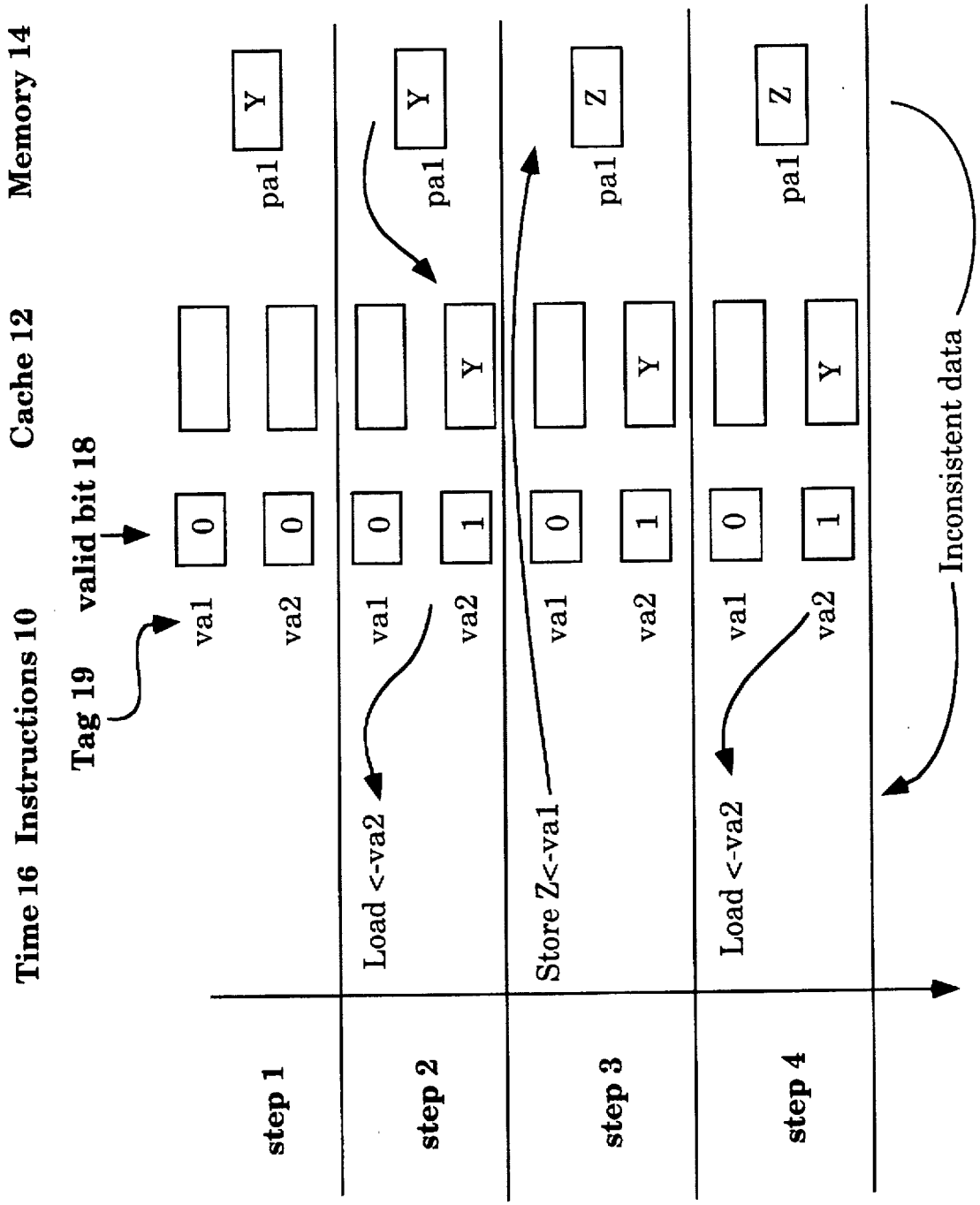
FIG. 3 is an exemplary illustration of how a stale data problem occurs in virtual data caches.
Figure 5:
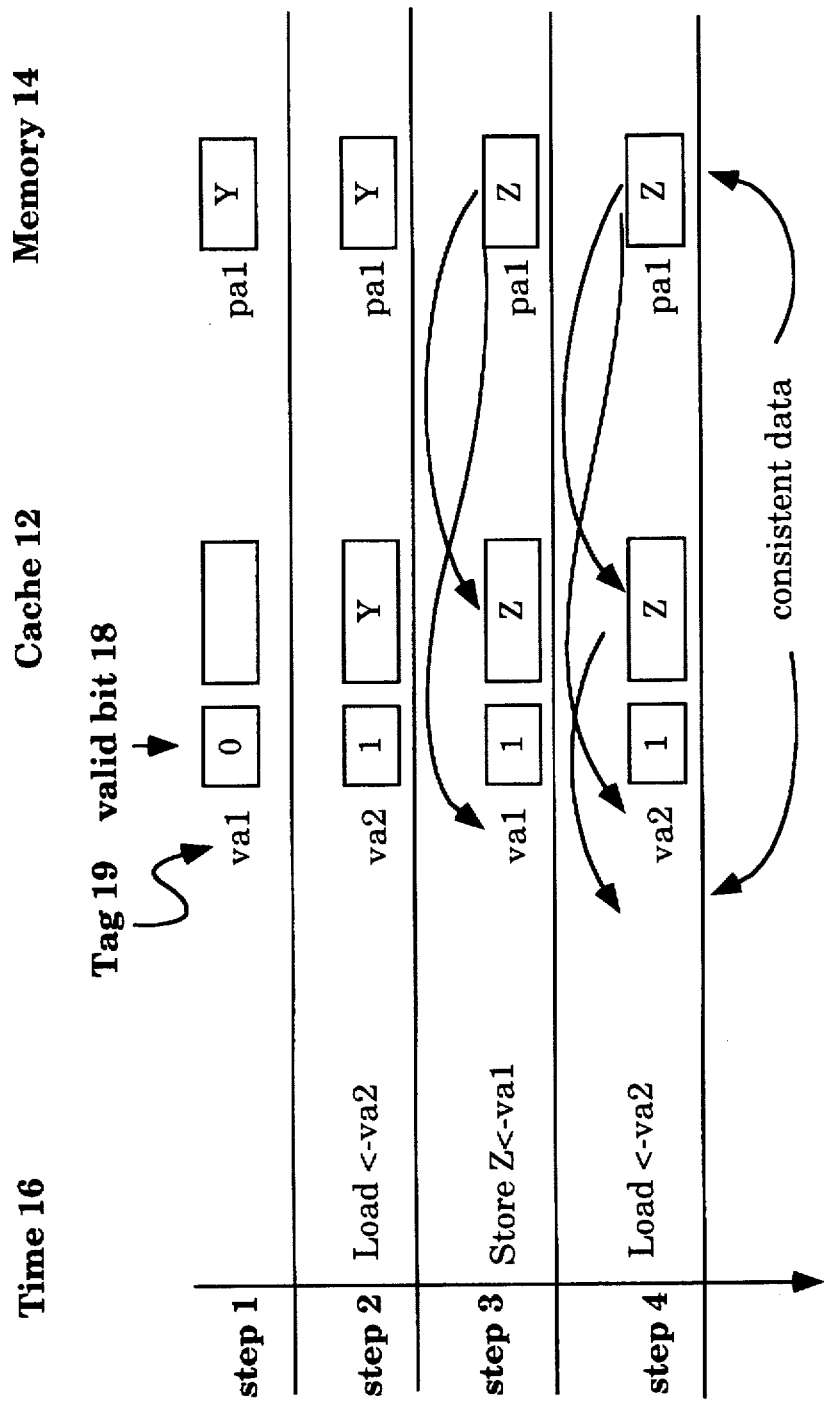
FIG. 5 illustrates an exemplary solution to the stale data problem in virtual data caches illustrated in FIG. 3 using the method of the present invention.

FIG. 5 illustrates an exemplary solution to the stale data problem in virtual data caches illustrated in FIG. 3 using the method of the present invention. Initially, in step 1, physical address 1 (pa1) contains data Y in main memory 14. Valid bit 18 is zero indicating that there is no valid data stored in the corresponding cache memory location. Cache tag 19 is the memory used to store the address tags of the corresponding lines held in a data cache. A current address is compared to the stored tags in the cache to determine a cache hit or a miss. The operating system guarantees that virtual address 1 (va1) and virtual address 2 (va2) both map to the same cache line.

In step 2, a load to va2 leads to a cache miss. This load to va2 changes the valid bit 18 to indicate that the va2 location of cache memory location 12 corresponding to pa1 of main memory 14 now has data and its value is Y. This data Y from pa1 was fetched from main memory 14 and is also received by the CPU, as well.

In step 3, va1 is not present in the cache memory, and a store of data Z to virtual address 1 leads to a cache miss. Thus, cache memory 12 is bypassed and data Z is stored in main memory 14. Then, using an allocate policy, the cache tag is updated to virtual address 1 and the data in cache 12 is updated to contain data Z.

In step 4, a load from va2 leads to a cache miss since the cache tag is now va1, hence va2 cannot be found in cache 12. Cache 12 is therefore bypassed and data Z, the correct data corresponding to va2, is fetched directly from main memory 14. The cache tag is also updated to va2 and the data in cache 12 is updated to data Z. Thus, loading of the stale data Y is avoided with the method of the present invention.

Figure 6:
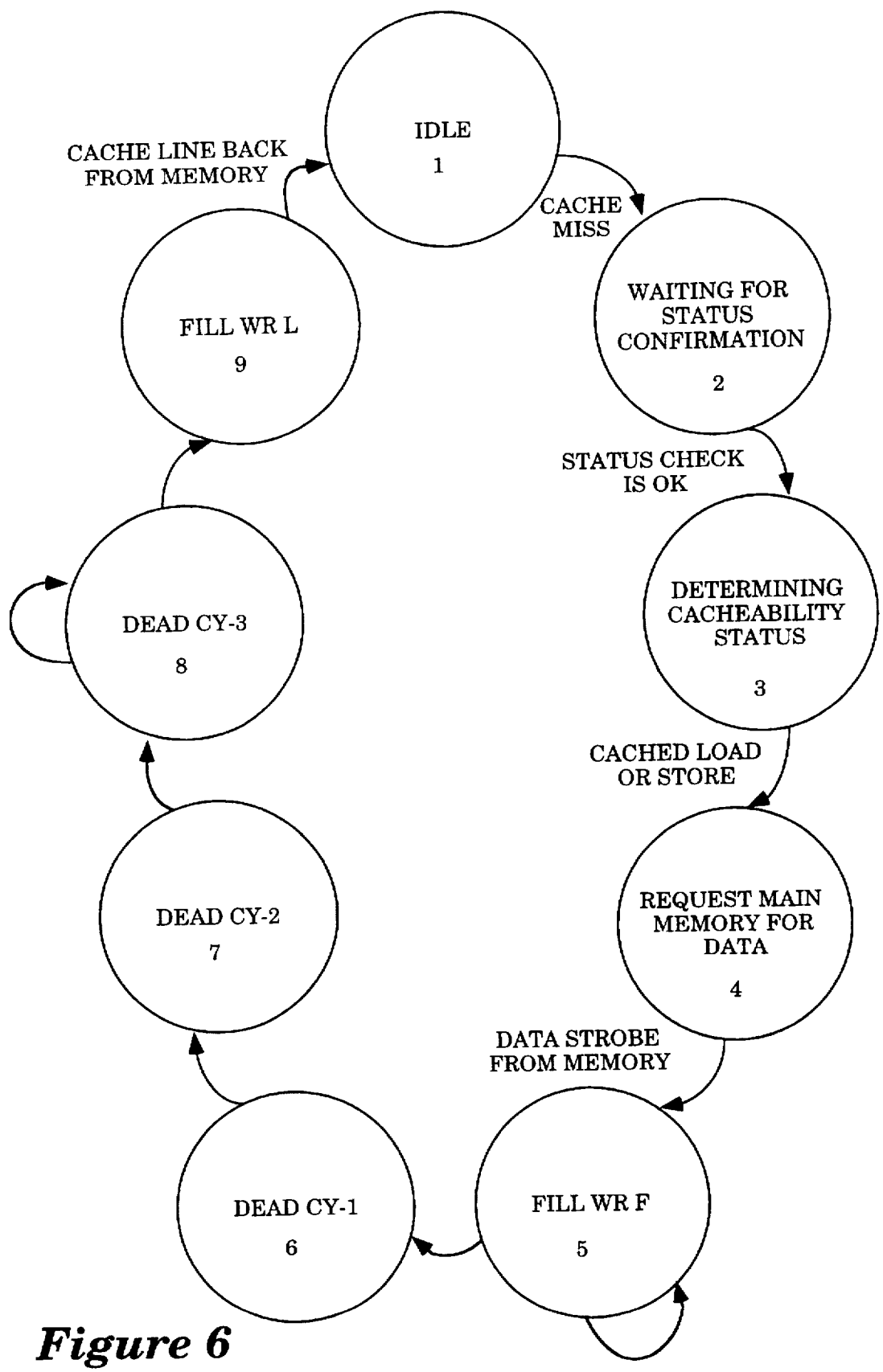
FIG. 6 is a data cache controller state machine illustrating the exemplary implementation of the present invention of FIG. 5.

FIG. 6 is an exemplary data cache controller state machine illustrating how a data cache controller can implement a store allocate policy for direct-mapped write-through virtual data caches. For the sake of illustration, an assumption is made that when the size of a cache line is 2x, the main memory returns data of size x per cycle. In state 1, data cache controller state machine is in an idle state until the data cache controller receives a cache miss request. In state 2, the data cache controller waits for a confirmation from the memory management unit on whether the data cache controller is to satisfy the cache miss request. In state 3, the cacheability status of the cache miss request is determined. If the request is a cached request such as a cached load or a cached store, there is a jump to state 4. In state 4, the data cache controller makes a request to the main memory to transmit data for the load or store instruction. Due to the store allocate policy, a cached load miss and a cached store miss are treated the same by the data cache controller. The data cache controller then begins receiving data back from the main memory.

A store miss is processed in the background mode without taking up CPU time, whereas during a load miss, the CPU is held up. Thus for a load miss, the data cache controller receives the cached line in which the load data exists and for a store miss, the data cache controller receives the cached line in which the store data resides. A cache line is an entry in a cache corresponding to a single set address. It is also the smallest portion of the cache which has a unique address tag. Data from the main memory is signaled to the data cache controller by data strobes from the main memory.

The state jumps from state 4 to state 5 when the data cache controller receives the first data strobe. The first data strobe is the first half of the cache line in the main memory in which the load data or the store data resides. This returned data is forwarded to the CPU and is also written into the data cache.

States 6 through 8 are dead cycles during which the main memory is accessing the next data double word. In state 8, a data strobe from main memory is signaled to the data cache controller indicating that the second half of the cache line is being transmitted by the main memory to the data cache controller. In state 9, the cache line is transmitted back from the main memory and the state returns to state 1 where the state machine waits for the next data cache miss to be serviced.

A person skilled in the art may implement the state machine using, for example, Programmable Logic Array (PLA) or combinatorial logic.

Figure 7:
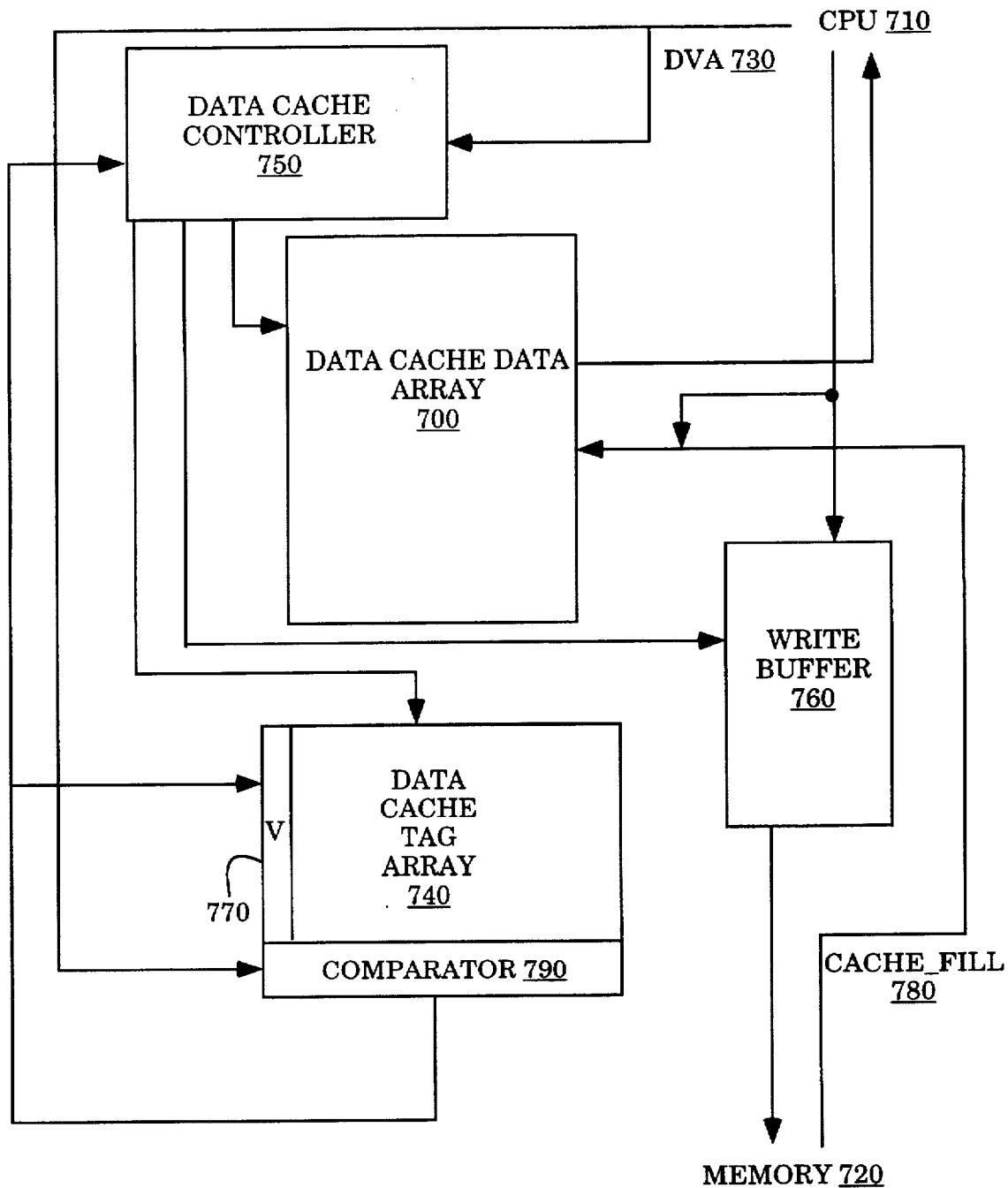
FIG. 7 is a block diagram illustrating an exemplary embodiment of the present invention.

FIG. 7 is a block diagram illustrating an exemplary embodiment of the present invention. Data cache data array 700 is a direct mapped cache, used on Load or Store accesses from CPU 710 to cacheable pages of main memory 720. Data cache data array 700 is virtually indexed and virtually tagged. Further, Stores are write-through with write allocate. Data cache data array 700 is addressed by data virtual address (DVA) 730 from CPU 710. Each cache line may have a cache tag store entry from data cache tag array 740 associated with it.

Data cache controller 750 transmits various control signals such as write enable control, counter control and load cache array. The various control signals are transmitted to data cache data array 700, data cache tag array 740 and write buffer 760. Data cache tag array 740 also has a field for valid bit buffer (V) 770. CPU 760 may write to main memory through write buffer 760, and to data cache data array 700. Data may also be written into data cache data array 700 as transmitted from memory 720 through cache fill 780. Finally, comparator 790 compares the data virtual address with the corresponding tag to see if there is a data cache hit or a miss. A signal indicating whether there is a data cache hit or a miss is driven into data cache controller 750. All CPU write operations 710 to cached locations write the data through to main memory 720. Therefore, on a write hit, both the data cache data array 700 and main memory 720 are updated. On cache misses the missed cached line is read from main memory 720 into data cache data array 700, and a write allocate is performed.

What has been described is a method and apparatus for solving the stale data problem for direct mapped write-through virtual data caches. The methods and apparatus of the present invention use a store allocate policy along with the write-through policy to ensure that the data contained in the main memory corresponding to a given virtual address is consistent with the data contained in the location in the data cache corresponding to the virtual address.

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those of ordinary skill in the art.

What is claimed is:

1. A method for preventing a stale data problem through the use of a store-allocate policy for a direct-mapped write-through virtual data cache, said stale data problem resulting during data transmissions made using virtual data caches, said method comprising the steps of:

mapping a plurality of virtual addresses to a predetermined physical location in a main memory, each of said plurality of virtual addresses having a data cache tag designating whether the corresponding virtual address is accessible by a processor, only one of said plurality of virtual addresses configured to be designated as accessible at any one time;

updating a value stored in said predetermined physical location in said memory with a new value upon a cache miss triggered by a store instruction initiated by said processor to store said new value to an inaccessible destination virtual address;

updating said destination virtual address with said new value on said cache miss and changing said data cache tag for a currently accessible virtual address to inaccessible and said data cache tag for said destination virtual address to accessible on said cache miss;

updating the value stored in an inaccessible source virtual address with the value stored in said predetermined physical location in said main memory upon said cache miss triggered by a load instruction by said processor to load said value from said inaccessible source virtual address, said value stored in said predetermined physical location in said main memory configured to be loaded in place of said value in said source virtual address, said data cache tag for a currently accessible one of said plurality of virtual addresses changed to inaccessible and said data cache tag for said source virtual address changed to accessible.

2. The method of claim 1, wherein said step of updating the location in a cache further comprises the steps of:

receiving a data cache miss request from a processor; and transmitting data from said main memory to said virtual data caches.

3. The method of claim 2, further comprising a step of signaling a data cache controller with a data strobe from said main memory indicating the beginning of a transmission of data from said main memory.

4. The method of claim 2, wherein said step of receiving a data cache miss request further comprises a step of receiving confirmation from a memory management unit on whether a data cache controller is to satisfy said cache miss request.

5. The method of claim 2, wherein said step of transmitting data further comprises a step of requesting said main memory to transmit data.

6. The method of claim 2, further comprising a step of signaling said data cache controller indicating beginning of transmission of additional data from said main memory.

7. The method of claim 3, further comprising the steps of:

forwarding said data to said processor; and writing said data into said data cache.

8. The method of claim 4, further comprising the step of determining a cacheability status of said cache miss request.

9. An apparatus for preventing a stale data problem through the use of a store-allocate policy for direct-mapped write-through virtual data caches, said stale data problem resulting during data transmissions made using virtual data caches, said apparatus comprising:

a main memory;

a virtual data cache for buffering data coupled to said main memory and addressable by a plurality of virtual addresses;

a processor for mapping said plurality of virtual addresses to the same physical location in said main memory and for mapping each of said plurality of virtual addresses to a predetermined location in said virtual data cache coupled to said main memory;

a data cache tag array configured to store cache tag entries corresponding to each entry in said virtual data cache, said data cache tag array including a field for a valid bit buffer which is a status bit used to identify cache addresses with currently valid data, said data cache tag array coupled to said processor; and a data cache controller coupled to said virtual data cache and said data cache tag array, said data cache controller configured to receiving a signal indicating a cache miss triggered by a store instruction initiated by said processor to store a new value in a destination virtual address designated by its data cache tag as being inaccessible, updating a value stored in said predetermined physical location in said main memory and said destination virtual address with said new value on said cache miss, changing a data cache tag for a currently accessible virtual address to inaccessible and a data cache tag for said destination virtual address to accessible upon said cache miss;

wherein said data cache controller is configured to updating the value stored in an inaccessible source virtual address with the value stored in said predetermined physical location in said main memory upon said cache miss triggered by a load instruction by said processor to load a value from said inaccessible source virtual address, said value stored in said predetermined physical location in said main memory configured to be loaded in place of said value in said inaccessible source virtual address, said data cache tag for a currently accessible one of said plurality of virtual addresses changed to inaccessible and said data cache tag for said source virtual address changed to accessible.

10. The apparatus of claim 9, further comprising a memory management unit coupled to said main memory for translating a virtual address into a physical address.

11. The apparatus of claim 9, wherein said data cache buffers data accessed by said processor from said main memory.

12. The apparatus of claim 9 further comprising a data cache tag array comprising of a data cache tag line entry corresponding to a data cache line in said data cache and indicates whether or not a given cache line has a valid entry.

* * * * *